United States Patent
Pignatale et al.

(10) Patent No.: US 12,351,097 B2
(45) Date of Patent: Jul. 8, 2025

(54) VEHICLE

(71) Applicant: ITALDESIGN-GIUGIARO S.P.A., Turin (IT)

(72) Inventors: Domenico Pignatale, Moncalieri (IT); Fabio Danna, Moncalieri (IT); Mirko Ballarini, Moncalieri (IT); Stefania Masuelli, Moncalieri (IT)

(73) Assignee: ITALDESIGN GIUGIARO S.P.A., Turin (IT)

( * ) Notice: Subject to any disclaimer, the term of this patent is extended or adjusted under 35 U.S.C. 154(b) by 0 days.

(21) Appl. No.: 18/569,688

(22) PCT Filed: Jul. 14, 2021

(86) PCT No.: PCT/IB2021/056329
§ 371 (c)(1),
(2) Date: Dec. 13, 2023

(87) PCT Pub. No.: WO2023/285857
PCT Pub. Date: Jan. 19, 2023

(65) Prior Publication Data
US 2024/0270151 A1    Aug. 15, 2024

(51) Int. Cl.
*B60Q 1/00* (2006.01)
*F21S 41/20* (2018.01)
(Continued)

(52) U.S. Cl.
CPC .......... *B60Q 1/0011* (2013.01); *F21S 41/285* (2018.01); *F21S 41/30* (2018.01); *F21S 41/635* (2018.01); *F21S 41/675* (2018.01)

(58) Field of Classification Search
CPC .......... F21S 41/24; F21S 41/16; F21S 41/125; F21S 41/285; F21S 41/675; F21S 41/365; B60Q 1/045
See application file for complete search history.

(56) References Cited

U.S. PATENT DOCUMENTS

| 5,438,485 A | 8/1995 | Li et al. |
| 10,323,814 B2 * | 6/2019 | Yagi ..................... F21S 41/135 |

(Continued)

FOREIGN PATENT DOCUMENTS

| DE | 4129955 A1 | 3/1993 |
| DE | 4341234 A1 | 6/1995 |

(Continued)

OTHER PUBLICATIONS

International Search Report and Written Opinion for International Application No. PCT/IB2021/056329 mailed Mar. 31, 2022.

*Primary Examiner* — Matthew J. Peerce
(74) *Attorney, Agent, or Firm* — Dorsey & Whitney LLP

(57) ABSTRACT

A vehicle comprising a body; a light source; a lighting assembly comprising, in turn, a frame is described; and means for transmitting the light generated by the source, constrained to the body and configured to transmit the light from the source to the lighting assembly; the source and the transmission means are constrained to the body and external to the frame; the lighting assembly an optical assembly configured to deflect a first light ray from the source and to form at least a second light ray; the optical assembly comprises a first portion fixed with respect to the frame; and a second portion, whose position is adjustable with respect to the frame so as to make said second light ray orientable in one between a first and second planer.

8 Claims, 3 Drawing Sheets

(51) Int. Cl.
    *F21S 41/30*    (2018.01)
    *F21S 41/63*    (2018.01)
    *F21S 41/675*   (2018.01)

(56) References Cited

U.S. PATENT DOCUMENTS

| | | | |
|---|---|---|---|
| 10,408,421 B2* | 9/2019 | Park | F21V 13/14 |
| 11,898,726 B2* | 2/2024 | Suwa | F21S 41/25 |
| 2020/0263850 A1* | 8/2020 | Kawaguchi | F21V 9/30 |

FOREIGN PATENT DOCUMENTS

| | | |
|---|---|---|
| DE | 102012205435 A1 | 10/2013 |
| EP | 3109541 A1 | 12/2016 |
| EP | 3399226 A1 | 11/2018 |
| WO | 2016035435 A1 | 3/2016 |

* cited by examiner

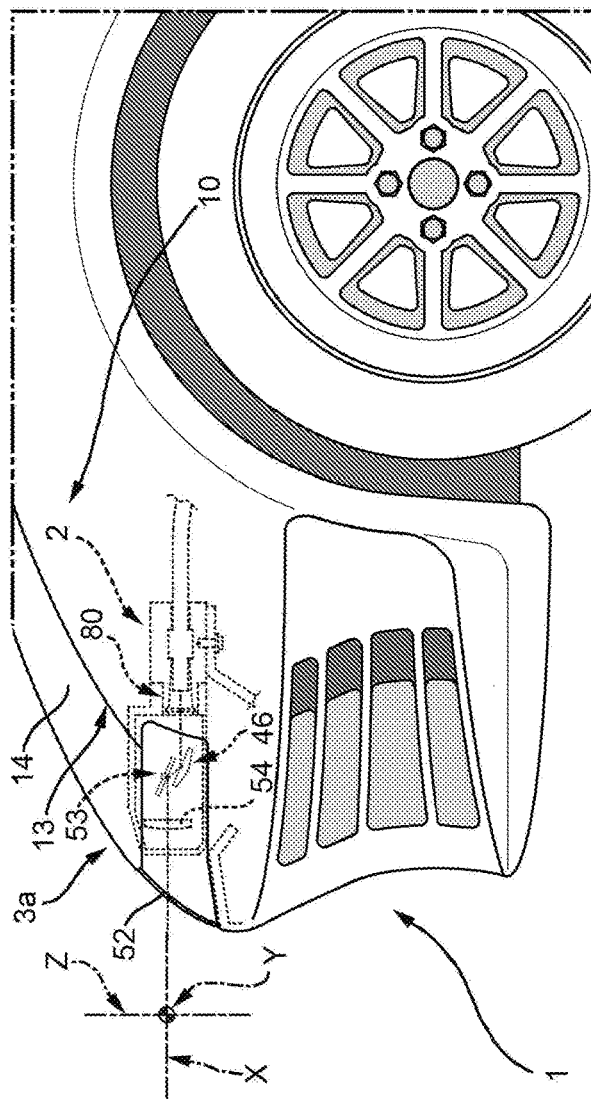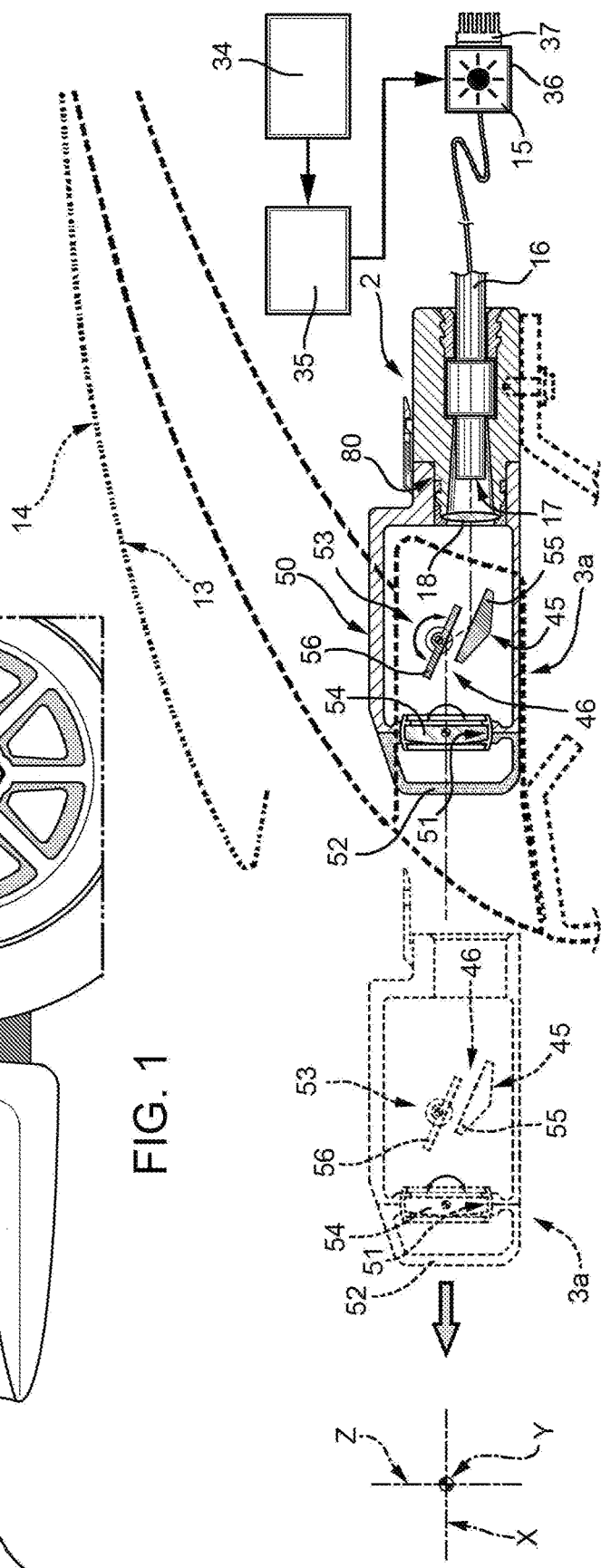

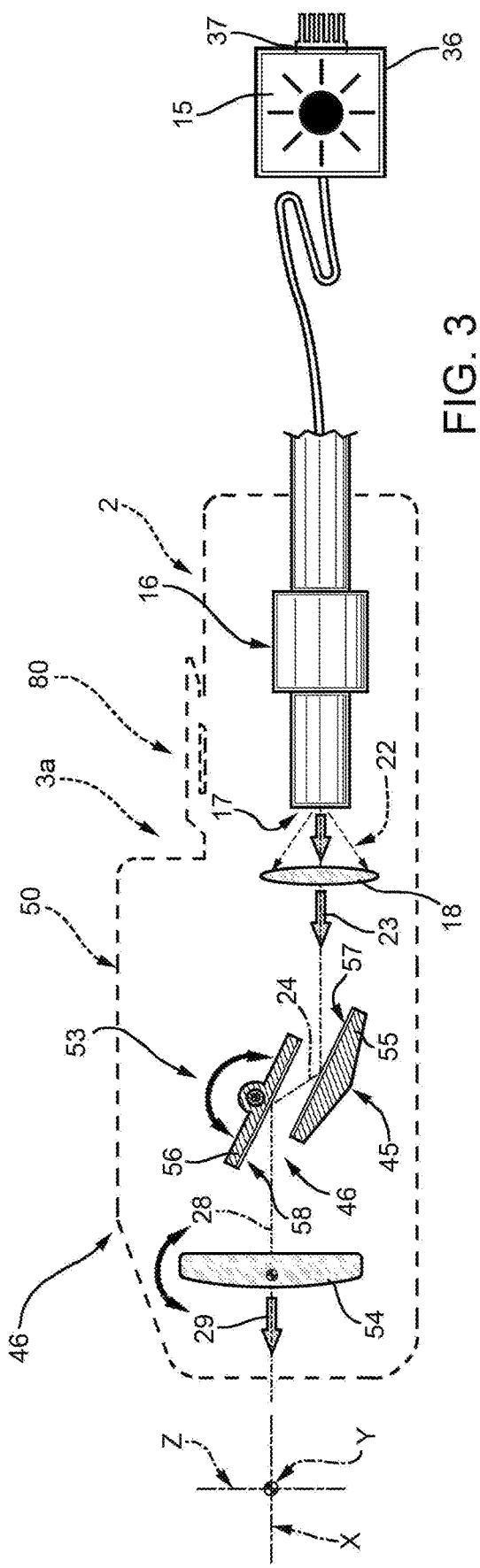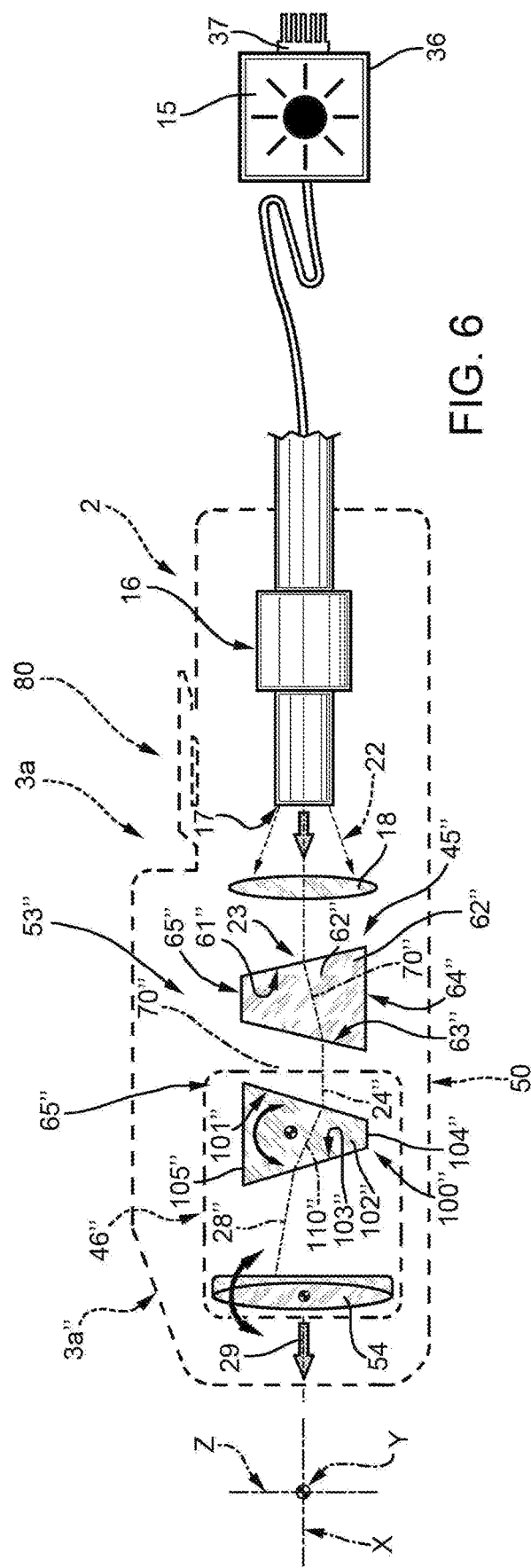

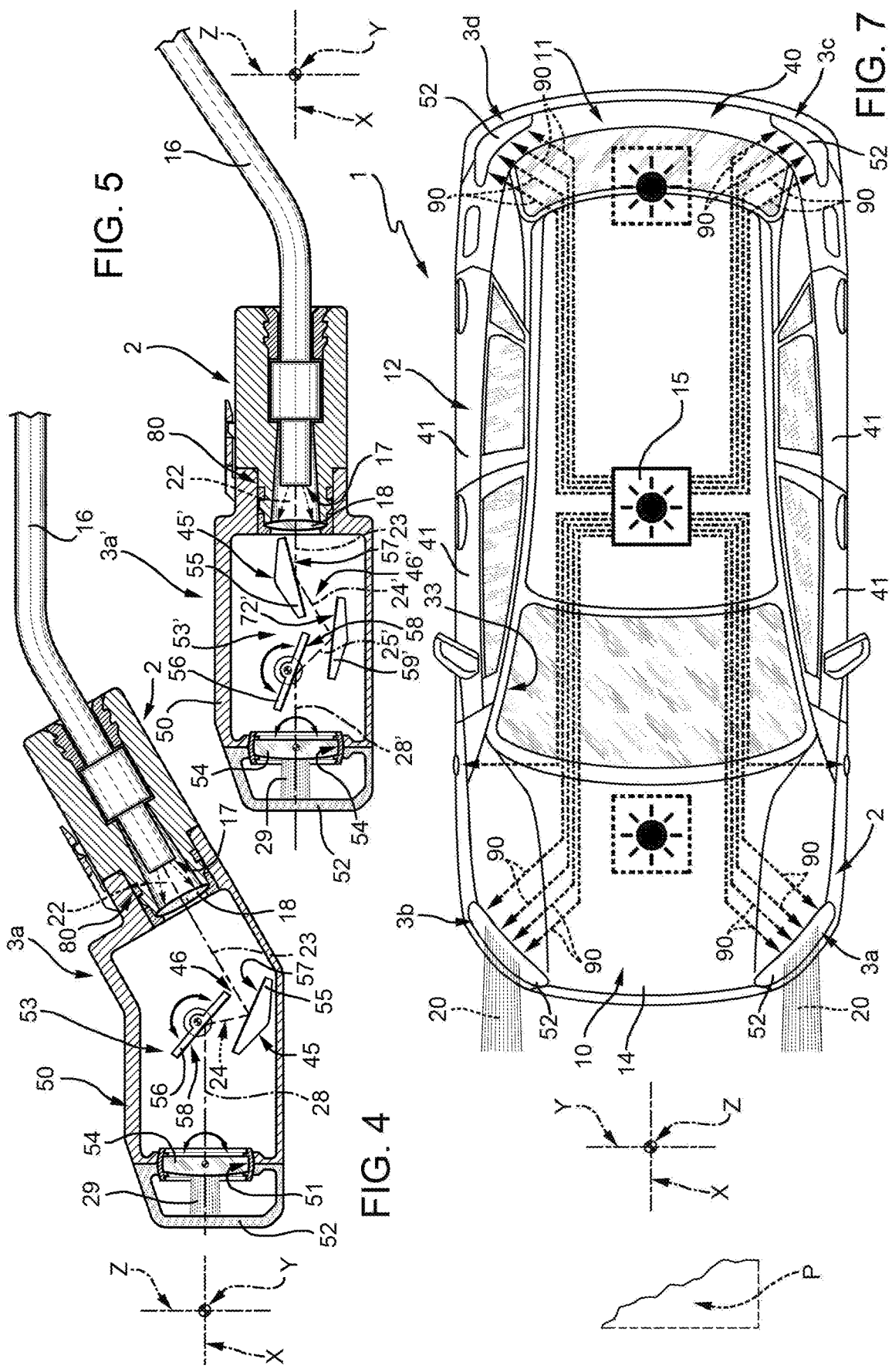

// VEHICLE

TECHNICAL FIELD

The present invention relates to a vehicle.

In particular, the vehicle could be a land vehicle, for example a motor vehicle or a motorcycle, or a marine vehicle, for example a jet ski.

BACKGROUND ART

Front lighting assemblies of a motor vehicle are known, essentially comprising:
- a frame fixed to the body of the motor vehicle;
- a lamp placed inside the frame; and
- a transparent cover placed at the end of the frame and connected to the frame.

In greater detail, the lamp comprises:
- a light source comprising for example LED lights; and
- an optical deflection element, for example a reflecting mirror of at least partly paraboloid shape, on which the light emitted by the light source strikes and provided to reflect a plurality of light rays that are substantially rectilinear towards the transparent cover and hence outwards of the motor vehicle.

The reflector is, in a known way, shaped as a concave surface open towards the transparent cover.

The transparent cover is formed by a lens which provides a desired conformation to the light rays reflected by the reflector.

In the case of LED light sources, the frame of lighting assemblies of known type further houses:
- a light source control unit adapted to control the light sources, based for example on road conditions and particular user settings;
- a PCB; and
- a heat sink.

U.S. Pat. No. 5,438,485 describes a lamp for a lighting assembly, comprising:
- a remote light source;
- a reflector defining a first paraboloid-shaped reflecting surface; and
- a light guide, e.g. an optical fibre, which transmits the light from the remote light source into the reflector with a certain conic angle.

The lamp further comprises:
- a converging lens that collects the light rays exiting the light guide; and
- a second reflecting surface, e.g. a spherical mirror.

The light rays exiting the converging lens strike the spherical mirror, which reflects these light rays towards the reflector.

The spherical mirror is arranged on the focal axis of the paraboloid-shaped reflector.

Thanks to the paraboloid shape, the reflector reflects the light rays in a substantially rectilinear way outside the lighting assembly.

The reflector, the spherical mirror and converging lens are fixed to the light guide.

There is a need in the industry to adjust the orientation of the light rays generated by the lighting assembly in the horizontal and vertical planes, especially when the aforesaid lighting assembly is arranged at the front of the motor vehicle, while at the same time reducing the overall dimensions of the lighting assembly with respect to the solutions of the known type, up to reaching vertical height values in the order of one third of the solutions of the known type.

DISCLOSURE OF INVENTION

Aim of the present invention is to realise a vehicle which allows to satisfy at least one of the needs specified above in a simple and economical way.

According to the invention, this aim is achieved by a vehicle as claimed in claim 1.

BRIEF DESCRIPTION OF THE DRAWINGS

For a better understanding of the present invention, three preferred non-limiting embodiments are described below, purely by way of example and with the aid of the attached drawings, in which:

FIG. 1 is a side view with parts removed for clarity's sake of a front portion of a first embodiment of a motor vehicle realized according to the dictates of the present invention;

FIG. 2 is a partially sectioned side view on an enlarged scale of a lighting assembly incorporated in the motor vehicle of FIG. 1, with parts indicated schematically;

FIG. 3 is a schematic side view on a further enlarged scale of the lighting assembly of FIGS. 1 and 2 and of some components of the motor vehicle; and FIG. 4 is a top view of the lighting assembly of FIGS. 1 to 3;

FIG. 5 is a schematic side view of a lighting assembly incorporated in a second embodiment of a motor vehicle realized according to the dictates of the present invention;

FIG. 6 is a schematic side view of a lighting assembly incorporated in a third embodiment of the motor vehicle realized according to the dictates of the present invention; and FIG. 7 is a view from the car of the motor vehicle according to the invention.

BEST MODE FOR CARRYING OUT THE INVENTION

With reference to FIG. 7, number 1 denotes a motor vehicle, in particular a motor vehicle, realized according to the invention and comprising a body 2 and a plurality of lighting assemblies 3a, 3b, 3c, 3d.

It should be noted that in the remainder of this description, expressions such as "upper", "lower", "front", "rear" and the like are used with reference to conditions of normal advancement of the motor vehicle 1.

It should also be noted that in the following description, the expression "light ray" means the path ideally followed by a rectilinear ray of light with infinitesimal thickness, according to the approximation of the geometric optics. In this approximation, the light rays travel in a homogeneous medium and with a negligible wavelength compared to the dimensions of the surfaces with which it interacts.

In greater detail, the motor vehicle 1 defines:
- a direction X parallel to the normal direction of advancement of the motor vehicle 1 and corresponding to a longitudinal direction of the motor vehicle 1;
- a direction Y orthogonal to the direction X and defining therewith a horizontal plane P (FIG. 7); and
- a direction Z orthogonal to the directions X and Y and defining with the direction Y a vertical plane Q (FIG. 2).

The directions X, Y, Z and the planes P and/or Q are integral with the motor vehicle 1.

The directions X, Y define respective longitudinal and transverse directions of the motor vehicle 1.

The body 2 comprises, in particular:
- a front portion 10 provided with a pair of assemblies 3a, 3b adapted to provide respective front lights to the motor vehicle 1;
- rear portion 11 provided with a pair of assemblies 3c, 3d adapted to provide rear lights of the motor vehicle 1 and further assemblies (not shown) adapted to provide a light relative to the subwoofer or to the positioning of a spare wheel not shown in the motor vehicle 1; and
- an intermediate portion 12 interposed between the front portion 10 and the rear portion 11, and provided with a further assembly (not shown) adapted to provide a light to a central console of the dashboard of the motor vehicle 1.

In particular, the intermediate portion 11 comprises, in turn:
- a compartment 13 for housing an engine; and
- a hood 14 movable with respect to the body 2 between an open position in which it allows access to the compartment 13 to a closed position in which it obstructs access to the compartment 13.

The rear portion 11 comprises, in turn:
- a compartment 32 for housing luggage; and
- a tailgate 40 movable with respect to the body 2 between an open position in which it allows access to the compartment 32 and a closed position in which it obstructs access to the compartment 32.

The intermediate portion 11 comprises, in turn:
- a passenger compartment 33; and
- a plurality of side doors 41, each of which is movable with respect to the body 2 between an open position in which it allows access to the passenger compartment 33 and a closed position in which it obstructs access to the passenger compartment 33.

The motor vehicle 1 also comprises a light energy source 15 adapted to power the assemblies 3a, 3b, 3c, 3d, 3e with the light energy necessary for their operation.

In the case shown in FIG. 7, the source 15 is arranged in the intermediate portion 12 of the motor vehicle 1.

Alternatively, the source 15 could be arranged in the front portion 10 or in the rear portion 11 of the motor vehicle 1.

The source 15 comprises, in the case shown, a plurality of LED lights.

Alternatively, the source 15 could comprise a plurality of laser lights.

The motor vehicle 1 further comprises, for each assembly 3a, 3b, 3c, 3d:
- a respective optical fibre 16 to transmit the light generated by the source 15; and
- a respective lens 18 arranged at an output 17 of the optical fibre 16.

The optical fibre 16 of each assembly 3a, 3b, 3c, 3d provides at an output 17 a plurality of light rays 22 inclined with respect to an axis parallel to the direction X.

The lens 18 of each assembly 3a, 3b, 3c, 3d is configured to refract the light rays 22 provided at the output of the optical fibre 16 and to form the light rays 23 parallel to the direction X.

In the case shown, the lens 18 is a converging lens.

The optical fibre 16, the lens 18 and the source 15 are fixed to the body 2.

The motor vehicle 1 further comprises (FIG. 2), for each assembly 3a, 3b, 3c, 3d:

- a command lever 35 (only schematically shown) operable by a user and adapted to command the relative optical assembly 3a, 3b, 3c, 3d; and
- a control unit 34 programmed to command the source 15, based on the actuation of the command lever 35.

The command lever 35 and the control unit 34 are fixed to the body 2.

The motor vehicle 1 further comprises, for each assembly 3a, 3b, 3c, 3d:
- a base 36 to support the source 15, e.g. a printed circuit board if the source 15 comprises LEDs; and
- a heat exchanger 37 provided to disperse the heat generated by the source 15.

The base 36 and the heat exchanger 37 are fixed to the body 2.

In particular, the base 36 is fixed to the source 15.

The motor vehicle 1 comprises, in particular:
- at least one assembly 3a, 3b adapted to project a high light beam in front of the motor vehicle 1; and
- at least one assembly 3a, 3b adapted to project a down light beam in front of the motor vehicle 1.

In the following of the present description only the assembly 3a is described, it being clear that all the assemblies 3a, 3b, 3c, 3d are identical to each other.

The assembly 3a comprises, in turn:
- a frame 50 removably mounted on the front portion 10 of the body 2 and defining a front opening 51; and
- a transparent cover 52 arranged to close the frame 50.

The light rays 29 strike on the transparent cover 52 and are refracted by the transparent cover 52 itself so as to provide a plurality of light rays 20 projected in front of the motor vehicle 1 (FIG. 7).

In the case shown, the frame 50 is connected to the body 2 by removable connection means, for example a shape coupling 80.

Advantageously, the assembly 3a comprises an optical assembly 53 configured to deflect the light rays 23 and to form a plurality of light rays 28; the optical assembly 53 comprises, in turn:
- a fixed portion 45 with respect to the frame 50; and
- a movable portion 46, the position of which is adjustable with respect to the frame 50 so as to make the light rays 28 orientable in the planes P and/or Q.

In particular, the optical assembly 53 comprises, in turn, a lens 54 configured to refract the light rays 28 incident thereon and to reflect the light rays 29 onto the transparent cover 52.

The optical assembly 53 is carried by the frame 50 and is removable from the body 2 integrally to the frame 50.

More specifically, the optical assembly 53 is decoupled from the body 2, the optical fibre 16 and the lens 18.

Accordingly, the optical assembly 53 can be removed from the body 2 integrally to the frame 50 without intervening on the optical fibre 16 and the lens 18.

Even more particularly, the frame 50 with the optical assembly 53 are removable from the front portion 10 when the hood 14 is in the open position.

In the case shown, the frame 50 with the optical assembly 53 can be extracted from the front portion 10 parallel to the direction X.

The fixed portion 45 of the optical assembly 53 comprises the mirror 55.

The movable portion 46 of the optical assembly 53 comprises the mirror 56 and the lens 54.

The mirror 55 reflects the light rays 23 so as to generate a plurality of light rays 24 transverse to the light rays 23 and to the directions X, Z.

The mirror 56 reflects the light rays 24 so as to generate the light rays 28.

The mirror 56 is movably fixed to the frame 50. The mirror 55 has a fixed position with respect to frame 50.

In greater detail, the mirror 56 is fixed to the frame 50 in a movable manner parallel to the direction Y and/or parallel to the direction Z.

In particular, the mirror 56 is hinged to the frame 50 about a first axis parallel to the direction Y and/or about a second axis parallel to the direction Z, so as to allow the inclination of the reflecting surface 58 with respect to the frame 50 to be adjusted in the plane P and/or the plane Q.

The mirrors 55, 56 are normally arranged inclined with respect to the direction X.

The lens 54 is a diverging lens, on which the light rays 28 parallel to the direction X strike and which refracts the diverging light rays 29 directed towards the transparent cover 52.

The lens 54 is preferably movably fixed to the frame 50.

In greater detail, the lens 54 is fixed to the frame 50 in a movable manner parallel to the direction Y and/or parallel to the direction Z.

In particular, the lens 54 is hinged to the frame 50 about a first axis parallel to the direction Y and/or about a second axis parallel to the direction Z.

More particularly, the lens 54 is integral with the mirror 56, so that the inclination of the light rays 29 with respect to the frame 50 can be adjusted in the plane P and/or the plane Q.

Depending on the positioning of the optical assembly 53, in particular the inclination of the surface 58 of the mirror 56, and the lying of the lens 54 with respect to the planes P, Q, the light beam 29 is projected along a certain direction in the planes P, Q.

In the embodiment shown in FIG. 7, the source 15 is of the LED type and provides light according to a plurality of single colours. The optical fibre 16 comprises a plurality of beams 90 receiving light from the source 15 according to respective individual colours.

The light exiting from the beams 90 is recomposed at the output 17 so as to obtain the desired colour effects, intensity variation and on-off sequences, based on the command given to the command lever 34.

In use, the command lever 34 is actuated to obtain a predetermined light function by the assemblies 3a, 3b, 3c, 3d.

Based on the actuation given to the command lever 34, the control unit 35 commands the source 15.

The heat sink 37 dissipates the thermal energy generated by the source 15 inside the body 2.

In the following of this description the operation of one of the assemblies 3a is described, the operation of the assemblies 3b 3c, 3d being similar to each other.

In greater detail, the optical fibre 16 transmits the light generated by the source 15 up to the output 17.

The light bounces back several times inside the optical fibre 16 until the light rays 22 with a certain angle of inclination with respect to the direction X, at the output 17 are formed.

The lens 18 refracts the diverging light rays 22 outputted by the optical fibre 16 and forms the light rays 23 parallel to the direction X.

Within the frame 50, the light rays 23 are reflected by the mirror 55, so as to generate the light rays 24 transversely to the light rays 23.

The mirror 56 then reflects the light rays 24, so as to generate the light rays 28 directed towards the lens 54.

The lens 54 refracts the light rays 28 so as to form the light rays 29 incident on the transparent cover 52.

The transparent cover 52, in turn, refracts the light rays 29 by generating the light rays 20 projected in front of the motor vehicle 1.

Depending on the actuation imposed on the command lever 34, the control unit 35 adjusts the inclination of the mirror 56 and, therefore, of the reflecting surface 58 and the lens 54 integral therewith in the planes P and/or Q.

Accordingly, the transparent cover 52 directs the light rays 20 in front of the motor vehicle 1 according to a desired orientation in the planes P and/or Q.

More precisely, the integral rotation of the surface 58 of the mirror 56 and of the lens 54 with respect to the frame 50 parallel to the directions Y and/or Z allows varying the position of the light rays 28 with respect to the frame 50. Consequently, the position of the light rays 20 in the planes P and/or Q is adjusted, depending on the command imposed by the user on the command lever 35 or automatically depending on the weight on the motor vehicle 1.

In the event of damage to the assembly 3a, 3b, the hood 14 is placed in the open position and the frame 50 is extracted from the body 2 parallel to the direction X (FIG. 2) and without intervening on the optical fibre 16 and on the lens 18. Once the frame 50 has been removed from the body 2, the mirrors 55, 56 and the lens 54 are completely extracted, it is possible to replace the assembly 3a, 3b.

Similarly, in the case of a re-styling of the motor vehicle 1 involving a change in the end position of the assembly 3a, 3b, the mirror 56 and the lens 54 are oriented with respect to the frame 50 so as to ensure that the light rays 20 are again in the correct position.

With reference to FIG. 6, number 3a' denotes a lighting assembly incorporated in a motor vehicle according to a second embodiment of the invention.

The assembly 3a' is similar to assembly 3a and will be described hereinafter only in so far as it differs from the latter; equal or equivalent parts of the assemblies 3a, 3a' will be marked, where possible, by the same reference numbers.

The assembly 3a' differs from the assembly 3a in that it comprises a mirror 59' optically interposed between the mirrors 55 and 56.

The mirror 59' has a fixed position with respect to the frame 50.

The mirror 59' is configured to reflect the light rays 24' from the mirror 55 and to generate a plurality of light rays 25' directed towards the mirror 56.

The mirror 59' comprises a reflecting surface 72', which is optically interposed between the reflecting surfaces 57, 58.

The light rays 24', 25' are transverse to the directions Y, Z.

The operation of the assembly 3a' differs from the operation of the assembly 3a in that inside the frame 50, the light rays 24' strike on the mirror 59' and are refracted by the mirror 59' so as to generate the light rays 25'.

The mirror 56 then reflects the light rays 25', so as to generate the light rays 28 directed towards the lens 54.

With reference to FIG. 6, number 3a" denotes a lighting assembly incorporated in a motor vehicle according to a third embodiment of the present invention.

The assembly 3a" is similar to assembly 3a and will be described hereinafter only in so far as it differs from the latter; equal or equivalent parts of the assemblies 3a, 3a" will be marked, where possible, by the same reference numbers.

The assembly 3a" differs from the assembly 3a in that the optical assembly 53 comprises a pair of optical prisms 60", 100" in place of the mirrors 55, 56.

The optical prisms 60", 100" are arranged consecutively to each other parallel to the direction X.

In particular, the optical prism 60" comprises:
- a face 61", on which the light rays 23 refracted by the lens 18 strike;
- a transparent body 62" crossed by the light rays 70" refracted by the face 61"; and
- a face 63", on which the light rays 70" are incident and which is configured to refract the light rays 24" directed towards the optical prism 100".

In particular, the transparent body 62" is a prism with a trapezoidal base delimited, in the case shown:
- from the faces 61", 63" to the part of the lens 18 and of the optical prism 100", respectively; and
- by a pair of faces 64", 65" opposite each other and parallel to each other, and interposed between the faces 61", 63".

Similarly, the optical prism 100" comprises:
- a face 101", on which the light rays 24" strike and which is configured to refract the light rays 110";
- a transparent body 102" crossed by the light rays 110" refracted by the face 101"; and
- a face 103", on which the light rays 110" are incident and which are configured to refract the light rays 28" directed towards the lens 54".

In particular, the transparent body 102" is a prism with a trapezoidal base delimited, in the case shown:
- from the faces 101", 103" to the part of the optical prism 60" and of the lens 54, respectively; and
- by a pair of faces 104", 105" opposite each other and parallel to each other, and interposed between the faces 101", 103".

The faces 61", 63", 64", 65" and 101", 103", 104", 105" intersect at a pair of bases opposite to each other parallel to the direction Y of the optical prisms 60", 100" shaped as isosceles trapezoids, in the case shown.

The aforesaid isosceles trapezoids have major bases defined by the faces 64", 105"; minor bases defined by the faces 65", 104"; and oblique sides defined by the faces 61", 63" and 101", 103".

More particularly, the faces 61", 101" and 64", 104" are arranged substantially in correspondence with each other parallel to the direction X.

The faces 64", 65", 104", 105" are orthogonal to the direction Z, in the case shown.

The faces 61", 63", 64", 65"; 101", 103", 104", 105" are flat.

The optical prism 100" is hinged to the frame 50 about an axis parallel to the direction Y and/or an axis parallel to the direction Z, so as to be able to selectively adjust the lying of the faces 101", 103" with respect to the frame 50 itself and, consequently, the orientation of the light rays 28" in the planes P and/or Q.

The lens 54 is movable parallel to the direction Y and/or to the direction Z integrally with the optical prism 100", so as to be able to adjust the orientation of the light rays 29 in the planes P and/or Q.

The operation of the assembly 3a" differs from the operation of the assembly 3a" in that within the frame 50, the light rays 23 strike on the face 61" of the optical prism 60" and are refracted inside the transparent body 62" forming the light rays 70".

The light rays 70" are, in turn, refracted by the face 63" of the optical prism 60" and form the light rays 24" incident on the face 101" of the optical prism 100".

The light rays 24" strike on the face 101" of the optical prism 100" and are refracted inside the transparent body 102" forming the light rays 110".

The light rays 110" are, in turn, refracted by the face 103" of the optical prism 100" and form the light rays 28" incident on the lens 54.

Furthermore, the operation of the assembly 3a" differs from the operation of the assembly 3a in that the inclination of the optical prism 100" and, therefore, of the lens 54 with respect to the frame 50 parallel to the directions Y and/or Z makes it possible to vary the position of the light beams 110", 28" and, consequently, to adjust the position of the light rays 29 in the planes P, Q, depending on the command imposed by the user to the command lever 35 or automatically depending on the weight on the motor vehicle 1.

From an examination of the characteristics of the motor vehicle 1 according to the present invention, the advantages that it allows obtaining are evident.

In particular, due to the fact that the mirror 56 (movable prism 100") has an adjustable position with respect to the frame 50, it is possible to adjust the orientation in the planes P, Q of the light rays 20, based on the commands given to the command lever 35 or automatically based on the weight of the motor vehicle 1.

This is achieved by reducing the overall dimension of the assembly 3a, 3b, 3c, 3d; 3a', 3b' with respect to the solutions of known type.

In fact, the frame 50 does not house either the optical fibre 16 or lens 18 and the optical assembly 53 is miniaturised.

Furthermore, it is possible to create additional space within the frame 50 to integrate new functions such as Lidar or Radar devices for ADAS.

It is clear that the motor vehicle 1 described and shown herein may be subject to modifications and variations without thereby departing from the scope of protection defined by the claims.

In particular, the motor vehicle 1 could be a motorcycle, a jet ski or any land/sea/air vehicle fitted with a lighting assembly.

One or more of the lens 54, the mirror 56, 56" and the optical prism 100" could be mounted on a joint fixed to the frame 50 so as to be inclinable parallel to the directions Y, Z.

The assembly 3a", 3b" may comprise only one of the optical prisms 60", 100" or more than two optical prisms 60", 100'.

The assembly 3a' could realize both a high and low beam light distribution or any further light distribution, for example by suitably shaping a surface of the mirror 56 opposite to the surface 58 and by rotating the mirror 56 by one hundred and eighty degrees when it is desired to vary the aforesaid light distribution.

Finally, the assembly 3a, 3b, 3c, 3d; 3a'; 3a" could comprise a light guide instead of the optic fibre 16.

The invention claimed is:

1. A vehicle, comprising:
    a body;
    a light source;
    a lighting assembly comprising, in turn, a frame; and
    means for transmitting the light generated, in use, by said light source, constrained to said body and configured to transmit the light from said source to said lighting assembly;

wherein said light source and said transmission means are constrained to said body and external to said frame;

wherein said lighting assembly comprises an optical assembly configured to deflect, in use, at least a first light ray from said source and to form at least a second light ray;

wherein said optical assembly including:
- a first portion fixed to said frame, wherein said first portion comprises a first mirror defining a first reflecting surface adapted to reflect said first light ray and to form a fourth light ray; and
- a second portion, the position of which is adjustable with respect to said frame so as to make said second light ray adjustable in at least one of a first or a second plane, the second portion comprising a lens housed within said frame, the second portion comprising a second mirror defining a second reflecting surface, said lens and said second mirror are moveably integral with each other with respect to the frame and are separate pieces;

wherein said first plane is arranged, in use, horizontally and being parallel to a first longitudinal direction of said vehicle;

wherein said second plane is in use, vertical and orthogonal to said first longitudinal direction of said vehicle;

wherein said second portion of said optical assembly is articulated to said frame in a movable manner parallel to a second direction and/or a third direction of said vehicle transverse to said first longitudinal direction;

said first longitudinal direction and said second direction defining said first plane;

said first longitudinal direction and said third direction by defining said second plane.

2. The vehicle according to claim 1, wherein a position of said second portion is adjustable in both said first and second plane with respect to said frame.

3. The vehicle according to claim 1, wherein said lens is positioned within said frame to be struck by said second light ray strikes, in use, said lens being configured to refract at least a third light ray outwards from said assembly.

4. The vehicle according to claim 1, wherein that said optical assembly comprises:
- a first optical element carried by said first portion, and configured to deflect said first light ray to form a fourth light ray; and
- a second optical element carried by said second portion, and configured to deflect said fourth light ray and to form said second light ray.

5. The vehicle according to claim 1, wherein said second reflecting surface is adapted to reflect said fourth light ray.

6. The vehicle according to claim 5, wherein said first reflecting surface is optically interposed between said transmission means and said second reflecting surface.

7. The vehicle according to claim 1, further: command means operable by a user of said vehicle; and a control unit programmed to adjust the position of said optical assembly, based on the state of said command means and/or based on at least one parameter representative of the operating conditions of said vehicle.

8. The vehicle according to claim 1, wherein said body defines a front portion with reference to a normal direction of travel of said vehicle, said assembly being fixed to said front portion.

* * * * *